US012761056B2

(12) United States Patent
Burton

(10) Patent No.: US 12,761,056 B2
(45) Date of Patent: Oct. 13, 2026

(54) PORTABLE POWDER DISPENSER

(71) Applicant: Grant Michael Burton, Cary, NC (US)

(72) Inventor: Grant Michael Burton, Cary, NC (US)

(73) Assignee: FitPouch LLC, Charlotte, NC (US)

( * ) Notice: Subject to any disclaimer, the term of this patent is extended or adjusted under 35 U.S.C. 154(b) by 178 days.

(21) Appl. No.: 18/588,991

(22) Filed: Feb. 27, 2024

(65) Prior Publication Data

US 2025/0271289 A1 Aug. 28, 2025

(51) Int. Cl.
*G01F 11/18* (2006.01)
*B65D 83/06* (2006.01)

(52) U.S. Cl.
CPC .............. *G01F 11/18* (2013.01); *B65D 83/06* (2013.01)

(58) Field of Classification Search
CPC ................................ G01F 11/18; B65D 83/06
See application file for complete search history.

(56) References Cited

U.S. PATENT DOCUMENTS 2,487,825 A * 11/1949 Olvis ...................... G01F 11/28 222/548
2,841,312 A * 7/1958 Bello ...................... A47K 5/10 222/363
3,179,303 A * 4/1965 Dankoff .................. G01F 11/46 222/452
5,588,563 A * 12/1996 Liu ...................... G01F 11/261 222/158
5,685,461 A * 11/1997 Mitchell ................ A47G 19/34 222/336
8,757,451 B2 6/2014 Schroedter
10,837,817 B1 * 11/2020 Kadoch ................ G01F 11/025
2007/0000953 A1 * 1/2007 Ranney .................. G01F 11/46 222/438
2012/0248138 A1 * 10/2012 Wollach .................. G01F 11/44 222/23
2015/0359388 A1 * 12/2015 Landau .................. A47J 47/01 222/1
2020/0047183 A1 * 2/2020 Blankenstein .......... B01L 3/523
2025/0271289 A1 * 8/2025 Burton .................... G01F 11/18

FOREIGN PATENT DOCUMENTS

CN 110525806 A * 12/2019 ............. B65D 53/00
CN 221955007 U * 11/2024
KR 200161457 Y1 * 12/1999 ............. B65D 83/06
KR 20090086913 A * 8/2009 ......... B65D 47/0885

* cited by examiner

*Primary Examiner* — Bob Zadeh
(74) *Attorney, Agent, or Firm* — James G. Passe; Passe Intellectual Property

(57) ABSTRACT

A portable device for storing and measuring powders such as drink mixes. The device allows a supply of powder to be attached and can measure and deliver a desired quantity of powders.

2 Claims, 5 Drawing Sheets

PORTABLE POWDER DISPENSER

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a powder dispenser. In particular, it relates to a powder dispenser for delivering a measured amount of powder.

Description of Related Art

Powdered substances such as protein powders, drink mixes and the like are well known to be hard to measure in exact amounts repeatedly. Numerous attempts to design powder dispensers has largely met with failure since no real control of measurement of the powder is achieved. In addition, it is frequently necessary to travel such as to the gym, vacation, and the like where the powder needs to be reconstituted. A storage and measurement device that is more efficient than prior art dispensers is needed.

BRIEF SUMMARY OF THE INVENTION

The present invention relates to a device with the ability to compress and store a desired amount of a powdered substance especially for reconstitution. It allows a user to travel with a larger quantity of powder and measure it to use, allowing multiple dosages to be used from the same device.

Accordingly, in one embodiment, there is a portable powder measuring and dispensing device comprising:

a) a barrel having a top and a bottom;

b) a barrel top lid containing an adjustable plunger;

c) a bottom which is attached to a container of powder to be measured; and d) an adjustable divider for measuring the powder and delivering the powder to the area below the plunger when the adjustable divider is open and wherein the adjustable plunger compresses the powder when the adjustable divider is closed.

DETAILED DESCRIPTION OF THE INVENTION

Figure 1:
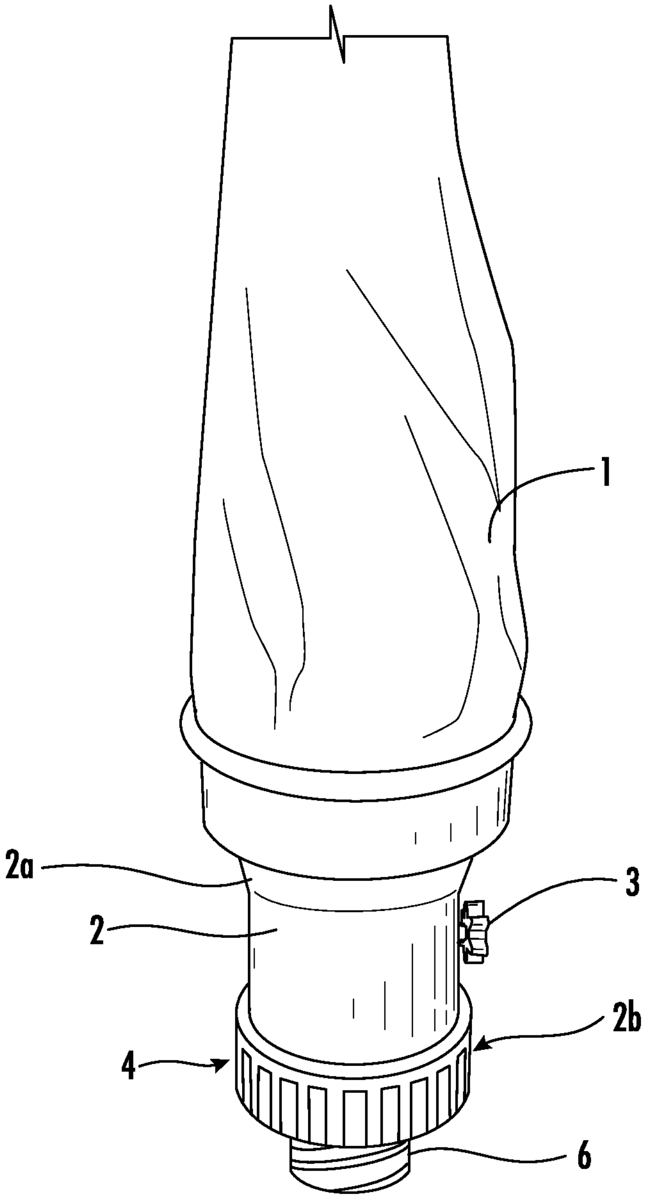
FIG. 1 is a perspective view of the device of the invention.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms “about” and “essentially” mean±10 percent.

The terms “a” or “an”, as used herein, are defined as one or as more than one. The term “plurality”, as used herein, is defined as two or as more than two. The term “another”, as used herein, is defined as at least a second or more. The terms “including” and/or “having”, as used herein, are defined as comprising (i.e., open language). The term “coupled”, as used herein, is defined as connected, although not necessarily directly, and not necessarily mechanically.

The term “comprising” is not intended to limit inventions to only claiming the present invention with such comprising language. Any invention using the term comprising could be separated into one or more claims using “consisting” or “consisting of” claim language and is so intended.

Reference throughout this document to “one embodiment”, “certain embodiments”, “an embodiment”, or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term “or”, as used herein, is to be interpreted as an inclusive or meaning any one or any combination. Therefore, “A, B, or C” means any of the following: “A; B; C; A and B; A and C; B and C; A, B, and C”. An exception to this definition will occur only when a combination of elements, functions, steps, or acts are in some way inherently mutually exclusive.

It is further noted that the claims may be drafted to exclude any element which may be optional. As such, this statement is intended to serve as antecedent basis for use of such exclusive terminology as “solely”, “only” and the like in connection with the recitation of claim elements, or the use of a “negative” limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. To the extent such publication may set out definitions of a term that conflict with the explicit or implicit definition of the present disclosure, the definition of the present disclosure controls.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "powder" refers to a dry, bulk solid composed of many very fine particles that may flow freely when shaken or tilted. Powders are a special sub-class of granular materials, although the terms powder and granular are sometimes used to distinguish separate classes of material. In one embodiment the powders are drink, protein or other food nutrition supplements that require measurement.

As used herein, the term "measuring and dispensing" refers to the device of the present invention capable of sequestering a desired amount of powder from a larger bulk quantity. The device can the dispense or deliver the powder for use. For example, a protein powder can be measured, dispends into a container, and water or other liquid is added for preparing the powder for drinking or other consumption.

As used herein, the term "barrel" refers to the body of the present device being a cylinder having an open top and bottom. In other embodiments it is still a tube-like shape, but it could be square or another shape opening. It does not have to have straight sides, for example a tapered shape is possible.

As used herein, the term "barrel top lid" refers to a lid for attachment to the top of the device that includes an adjustable plunger for compressing the powder in the top of the barrel after the adjustable divider has moved to the closed position.

Figure 2:
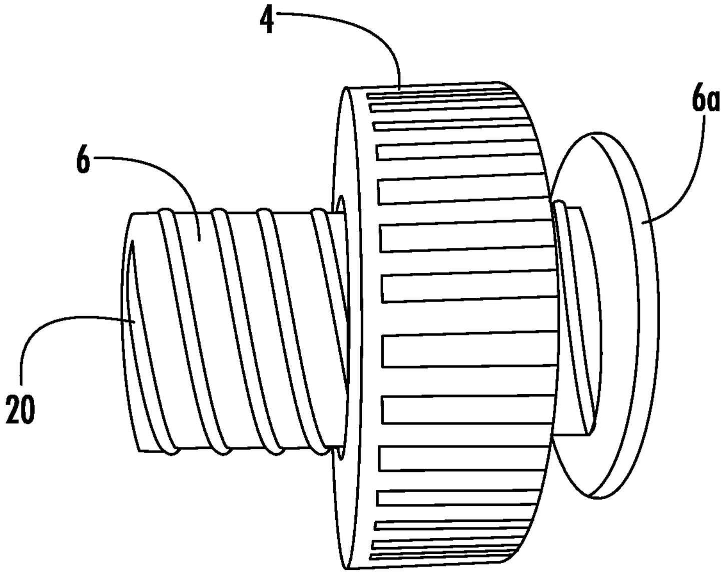
FIG. 2 is a perspective of a barrel top lid with a plunger.

As used herein, the term "adjustable plunger" refers to a plunger in the barrel top lid which is adjustable in the length and extends downward from the barrel top lid, see FIG. 2 as an example. Any cylindrical device that operates with a plunging motion, as a piston is contemplated. In the figures, the length is adjusted based on screwing the plunger in or out as needed but any method of adjusting the plunger is contemplated.

Figure 4:
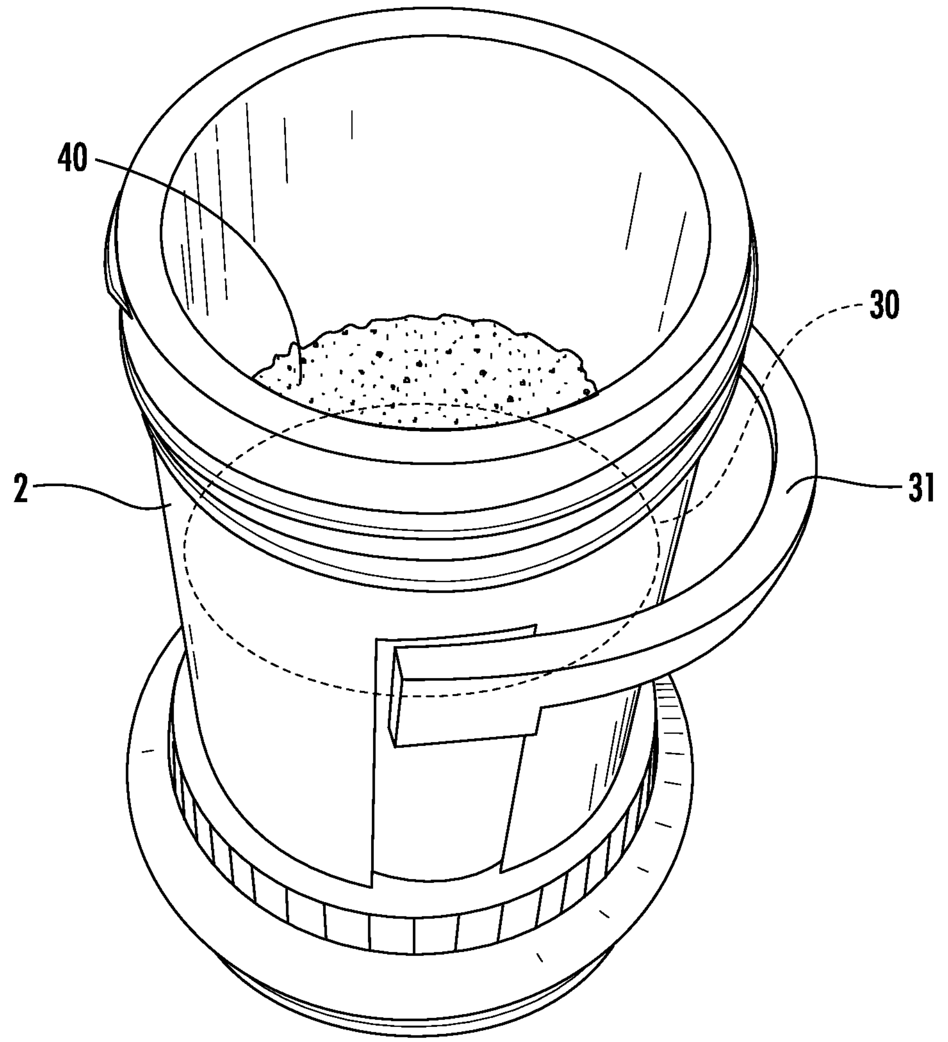
FIG. 4 is a perspective view of the barrel having a control lever for the divider.
Figure 5:
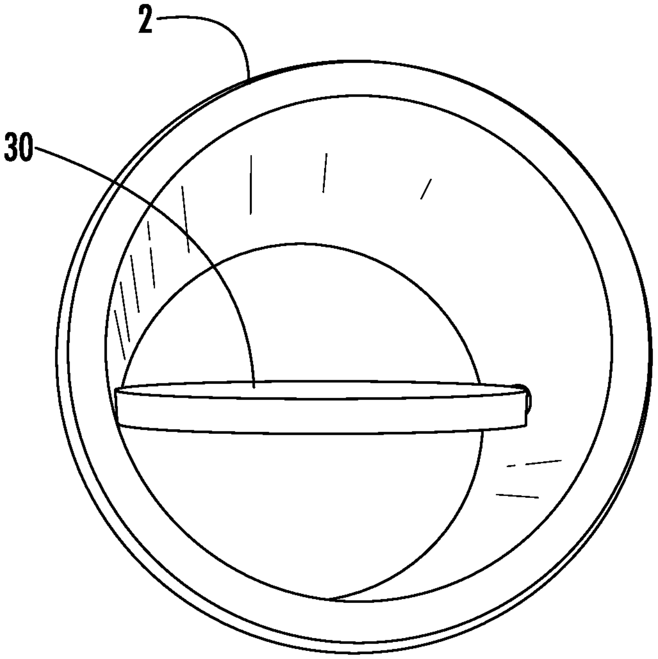
FIG. 5 is a perspective view showing the adjustable divider in the open position.

As used herein, the term "adjustable divider" refers to a swivel device that allows the powder to move from the container to the top of the device with the desired amount of powder and compresses the powder against the plunger. FIG. 5 is an example of the adjustable divider in the open position while FIG. 4 depicts the device being closed and to create a floor.

As used herein, the term "area below the plunger" refers to the area between the plunger and the closed adjustable divider.

As used herein, the term "compresses the powder" refers to the powder being compressed between the divider and the plunger when the divider is closed.

As used herein, the term "control knob" refers to a knob that can open and close the divider by twisting the knob.

As used herein, the term "control lever" refers to a lever, for example as shown in FIG. 4 which can open and close the divider by moving the lever up or down.

DRAWINGS

Now referring to the drawings, FIG. 1 is a view of an embodiment of the present portable powder measuring and dispensing device. In this view, container of powder 1 is attached to the barrel 2 at the bottom of the barrel 2*a*. At the top end of the barrel 2*a* is a barrel cap 4 with an adjustable plunger 6 screwed into the top end of barrel cap 4. On barrel 2 is a control knob 3 for opening and closing the adjustable divider (not seen in this view) by twisting the knob.

FIG. 2 is the barrel cap 4 with the plunger 6. In this view the ridges 20 can be seen which allows the plunger 6 to adjust inward or outward, the plunger barrel side end 6*a* is a float disc-like end designed to compress powder.

Figure 3:
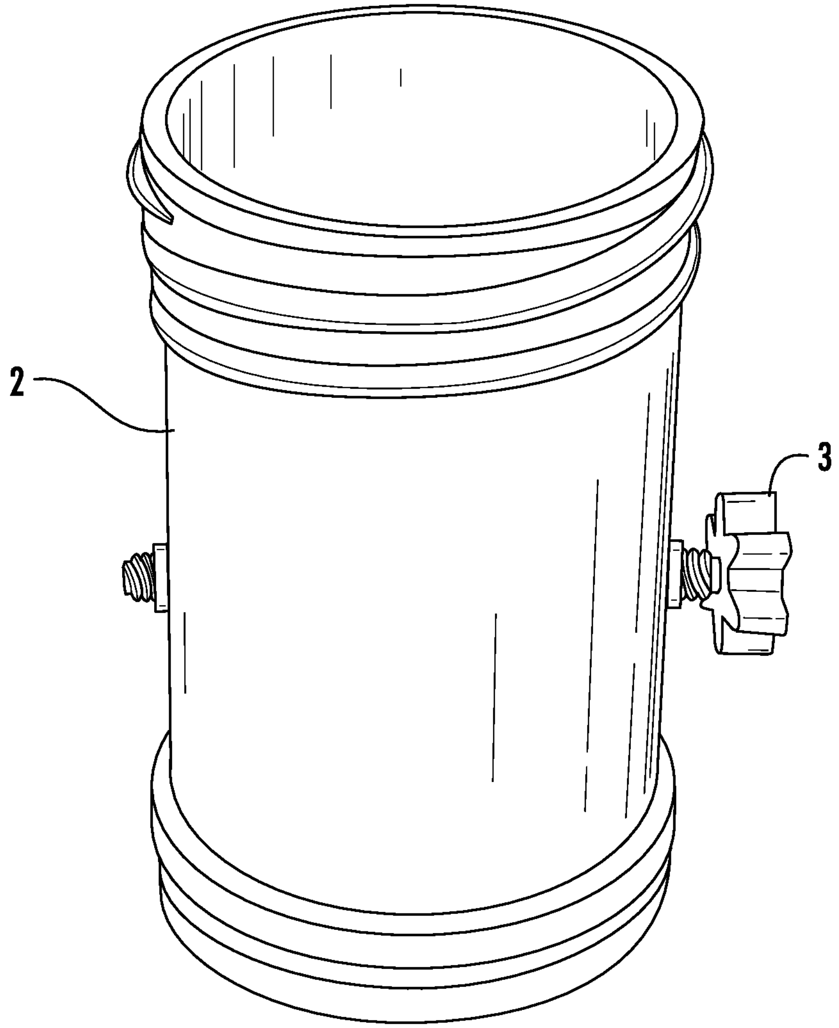
FIG. 3 is a perspective view of the barrel having a control knob for the divider.

FIG. 3 is the isolated barrel 2, the control knob 3 can clearly be seen in this perspective view.

FIG. 4 is a perspective of a barrel 2 with a control lever 31 instead of a control knob. The adjustable divider 30 is shown in this view. By moving the control handle up or down the adjustable divider can be adjusted to open or closed. The adjustable divider is shown in the closed position. The powder 40 shown measured using the adjustable divider above the adjustable divider is compressed when the cap and plunger are screwed onto the top end.

FIG. 5 shows the barrel 2 with the adjustable divider 30 in the open position.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A portable powder measuring and dispensing device comprising a barrel and a container, wherein the barrel having:

a) a top and a bottom;

b) a top lid containing an adjustable plunger wherein the plunger has a round barrel side disc;

c) a bottom which is attached to the container of powder to be measured; and d) an adjustable divider for measuring the powder and delivering the powder to an area below the plunger when the adjustable divider is open and wherein the adjustable plunger compresses the powder when the adjustable divider is closed wherein the adjustable divider is a single disc which rotates to an open or closed position, wherein the adjustable divider can be opened and closed using either a control knob or a control lever.

2. The portable powder measuring and dispensing device according to claim 1 wherein the adjustable plunger can be adjusted by screwing the plunger to a desired length.

* * * * *